US005760304A

United States Patent [19]

Lynch

[11] Patent Number: 5,760,304
[45] Date of Patent: Jun. 2, 1998

[54] VIBRATORY ROTATION SENSOR WITH AC FORCING VOLTAGES

[75] Inventor: David Dexter Lynch, Santa Barbara, Calif.

[73] Assignee: Litton Systems, Inc., Woodland Hills, Calif.

[21] Appl. No.: 802,007

[22] Filed: Feb. 18, 1997

[51] Int. Cl.⁶ .................................................. G01C 19/00
[52] U.S. Cl. ................................ 73/504.13; 73/504.12
[58] Field of Search ........................ 73/504.13, 504.12, 73/504.02, 504.03, 504.04, 1.84, 1.82, 1.77; 310/369

[56] References Cited

U.S. PATENT DOCUMENTS

| | | | |
|---|---|---|---|
| 3,924,475 | 12/1975 | Stiles | 73/504.13 |
| 4,793,195 | 12/1988 | Koning | 74/5.6 D |
| 4,951,508 | 8/1990 | Loper, Jr. et al. | 73/504.13 |
| 5,336,960 | 8/1994 | Shimizu et al. | 310/369 |
| 5,471,875 | 12/1995 | Sato et al. | 73/504.13 |
| 5,616,864 | 4/1997 | Johnson et al. | 73/504.04 |
| 5,621,171 | 4/1997 | Fell | 73/504.13 |

*Primary Examiner*—Hezron E. Williams
*Assistant Examiner*—Richard A. Moller
*Attorney, Agent, or Firm*—Robert E. Malm

[57] ABSTRACT

The invention is a method for applying forces to the resonator of a vibratory rotation sensor (VRS) by establishing an ac voltage between conducting regions of a surface of the resonator and one or more forcer electrodes opposing the conducting regions. The method comprises the steps of generating a first ac voltage having a first frequency and a first phase, generating a second ac voltage having a second frequency, and establishing the difference of the first and second ac voltages between conducting regions of a surface of the resonator and the one or more forcer electrodes. The first and second ac voltages are synchronized to the displacement of a point on the resonator when the resonator is vibrating. The ratio of the vibrational frequency of the VRS to either the difference or the sum of the first and second frequencies is a ratio of integers.

3 Claims, 1 Drawing Sheet

VIBRATORY ROTATION SENSOR WITH AC FORCING VOLTAGES

CROSS-REFERENCES TO RELATED APPLICATIONS

The subject matter of this invention is shared by the inventions disclosed in patent applications (U.S. Ser. No. 08/802,006) *Vibratory Rotation Sensor with Multiplex Electronics* by Matthews, Darling, and Varty, (U.S. Ser. No. 08/802,009) *Vibratory Rotation Sensor with Whole-Angle Tracking* by Matthews, Varty, Li, and Lynch, and *Vibratory Rotation Sensor with AC Forcing and Sensing Electronics* by Kumar and Foster.

BACKGROUND OF THE INVENTION

This invention relates generally to vibratory rotation sensors and more specifically to the electronics associated with such rotation sensors.

A prior-art vibratory rotation sensor (VRS) 10 consisting of an outer member 12, a hemispherical resonator 14, and an inner member 16, all made of fused quartz and joined together with indium, is shown unassembled in FIG. 1. The inertially-sensitive element is the thin-walled, 5.8-cm-diameter hemispherical resonator 14 positioned between the outer member 12 and the inner member 16 and supported by the stem 26.

A ring forcer electrode 20 and sixteen discrete forcer electrodes 22 are bonded to the interior surface of the outer member 12. In the assembled VRS 10, the ring forcer electrode 20 and the sixteen discrete forcer electrodes 22 are in close proximity to the exterior metalized surface 32 of the hemispherical resonator 14. In the assembled VRS, eight pickoff electrodes 24 attached to the inner member 16 are in close proximity to the interior metalized surface 30 of the hemispherical resonator 14.

Capacitive forces can be exerted on the hemispherical resonator 14 by means of appropriate forcing voltages between the metalized surface 32 and the ring forcer electrode 20 to cause the hemispherical resonator to vibrate in the lowest-order inextensional (or flexing) mode. A standing wave is established having four antinodes at 90-degree intervals about the circumference with four nodes offset by 45 degrees from the antinodes. The 0-degree and 180-degree antinodes are 90 degrees out of phase with 90-degree and the 270-degree antinodes. The standing wave causes the shape of the rim of the hemispherical resonator to change from circular to elliptical (with major axis through the 0-degree/180-degree antinodes) to circular to elliptical (with major axis through the 90-degree/270-degree antinodes.

Rotation of the VRS 10 about an axis normal to the plane of the hemispherical-resonator rim 34 causes the standing wave to rotate in the opposite direction by an angle proportional to the angle of rotation of the VRS 10. Thus, by measuring the angle of rotation of the standing wave with respect to the VRS 10, one can determine the angle of rotation of the VRS 10.

The vibrational mode of the hemispherical resonator 14 is excited by placing a DC bias voltage on the hemispherical resonator 14 and an AC voltage on the ring forcer electrode 20, the frequency of the AC voltage being twice the resonant frequency of the hemispherical resonator 14.

The standing-wave pattern angle with respect to the VRS 10 is determined by measuring the currents that flow into and out of the pickoff electrodes 24 as the hemispherical resonator 14 vibrates and the capacitances of the pickoff electrodes 24 with respect to the metalized interior surface 30 of the hemispherical resonator 14 vary. An x-axis signal $I_x$ is obtained from the combination $I_0-I_{90}+I_{180}-I_{270}$ where the subscripts identify the angular positions relative to the x axis of the electrodes from which the currents originate. Similarly, a y-axis signal $I_y$ is obtained from the combination $I_{45}-I_{135}+I_{225}-I_{315}$. The tangent of twice the standing-wave pattern angle with respect to the 0-degree (i.e. x) axis is given by the ratio of $I_y$ to $I_x$.

As a result of nonuniformities in the thickness of the hemispherical resonator 14, the establishment of a first standing wave will lead to the development of a second standing wave oscillating in phase quadrature with antinodes coinciding with the nodes of the first standing wave. The development of a second standing wave can be inhibited by placing appropriate voltages on the sixteen discrete forcer electrodes 22.

A dc bias voltage is typically maintained on the exterior metalized surface 32 of the hemispherical resonator 14 in order to reduce the magnitudes of the ac forcing voltages applied to the ring forcer electrode 20 and the discrete forcer electrodes 22 and to make the force exerted on the resonator a linear function of the ac driving voltage. The presence of the dc bias voltage results in slow changes in the electrical properties of the VRS which have been attributed to capacitance changes caused by charge-migration phenomena taking place at or within the outer member 12 and the inner member 16. These slow changes have resulted in an unacceptably large performance degradation over time and special means have to be provided to compensate for these effects.

SUMMARY OF THE INVENTION

The invention is a method for applying forces to the resonator of a vibratory rotation sensor (VRS) by establishing an ac voltage between conducting regions of a surface of the resonator and one or more forcer electrodes opposing the conducting regions. The method comprises the steps of generating a first ac voltage having a first frequency and a first phase, generating a second ac voltage having a second frequency and establishing the difference of the first and second ac voltages between conducting regions of a surface of the resonator and one or more forcer electrodes. The first and second ac voltages are synchronized to the displacement of a point on the resonator when the resonator is vibrating;

The ratio of the vibrational frequency of the VRS to either the difference or the sum of the first and second frequencies is a ratio of integers.

DESCRIPTION OF THE PREFERRED EMBODIMENTS

Figure 1:
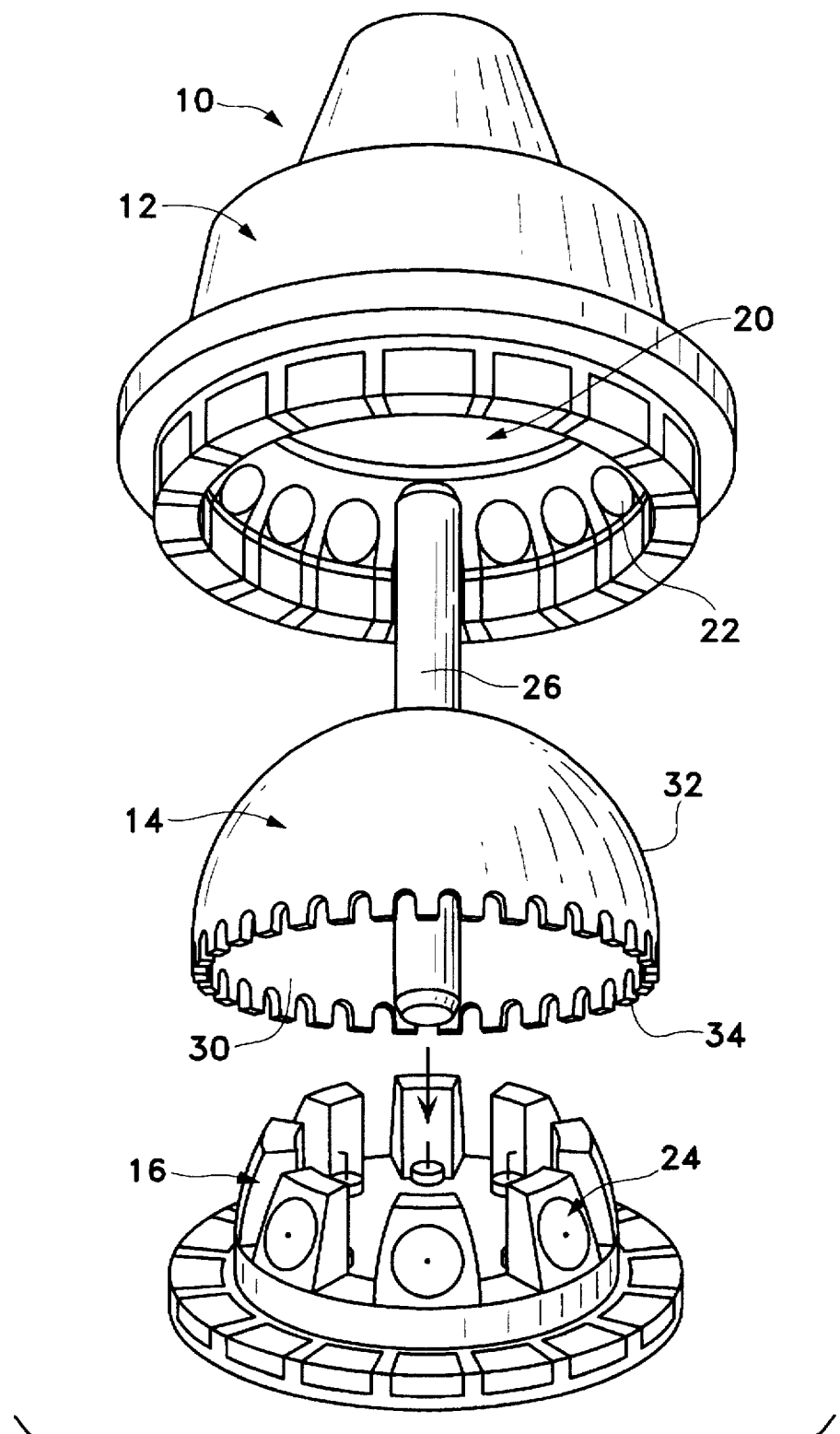
FIG. 1 shows the component parts of a prior-art vibratory rotation sensor.

In prior-art mechanizations, a dc bias voltage has been maintained on the resonator in order, among other purposes, to reduce the magnitude of the ac forcing voltages required and to make the force exerted on the resonator a linear function of the ac driving voltage. The present invention achieves these two aims by simply utilizing a properly-phased ac bias voltage on the resonator (or equivalently on the forcer electrodes, since it is the potential difference between the electrodes and the resonator that is related to the force on the resonator).

The presence of the dc bias voltage in prior-art VRS mechanizations has resulted in slow changes in the electrical properties of the VRS. These changes have been interpreted as resulting from capacitance changes caused by charge-migration phenomena taking place at or within the fused-silica dielectric that comprises the electrode housings. The presence of these slow changes has resulted in unacceptably large VRS performance degradation. Special means have to be provided to compensate for these effects. Elimination of the dc bias voltage on the resonator has been viewed as a means of reducing or eliminating the effects of charge-migration phenomena ever since they were first observed.

The ring forcer electrode 20 or one of the discrete forcer electrodes 22 of the VRS form a portion of a spherical capacitor with the portion of the exterior metalized surface 32 of the resonator 14 it faces across the small vacuum gap. If a potential difference V exists between the electrode and the resonator, a force F proportional to $V^2$ is exerted on the resonator. For example, in prior-art VRS mechanizations the dc bias voltage $V_{Bo}$ was placed on the resonator and the driving voltage $V_\omega \sin \omega t$ was placed on the forcer electrode. Equivalently, the voltage $V_\omega \sin \omega t - V_{Bo}$ could have been placed on the forcer electrode and the resonator could have been grounded. In either case, the resulting force on the resonator proportional to the voltage difference between the forcer electrode and the resonator is given by $$F \propto (V_\omega \sin \omega t - V_{Bo})^2 = \tfrac{1}{2}V_\omega^2 (1-\cos 2\omega t) - 2V_\omega V_{Bo} \sin \omega t + V_{Bo}^2 \quad (1)$$

The constant terms have practically negligible effect on the resonator dynamics, and the term proportional to $\cos 2\omega t$ has a very small effect. The force on the resonator is therefore predominantly proportional to the second term in the expression above.

$$F \propto V_\omega V_{Bo} \sin \omega t \quad (2)$$

The use of the dc bias voltage $V_{Bo}$ has therefore accomplished the linearization of the dependence of the force on the amplitude of the driving voltage $V_\omega$ and the reduction in the requirements on the magnitude of $V_\omega$ since, for a given force, $V_\omega$ may be reduced if the bias voltage is correspondingly increased.

Forces are applied to the resonator to maintain the desired mode of oscillation, to suppress quadrature oscillation, and in the force-to-rebalance mode, to maintain the standing wave in a fixed orientation relative to the VRS housing. Forces to accomplish these purposes can be generated by establishing a voltage $(V_1-V_2)$ between the hemispherical resonator and one or more forcing electrodes on the VRS housing where $$V_1 = V_{\omega 1} \sin \omega_1 t$$

$$V_2 = V_{\omega 2} \sin (\omega_2 t + \Phi) \quad (3)$$

The resulting force F is proportional to $(V_1-V_2)^2$:

$$F \propto [V_{\omega 1} \sin \omega_1 t - V_{\omega 2} \sin (\omega_2 t + \Phi)]^2 \quad (4)$$

This expression can be rewritten as $$F \propto V_{\omega 1}^2 + V_{\omega 2}^2 - \quad (5)$$
$$V_{\omega 1}^2 \cos 2\omega_1 t - V_{\omega 2}^2 \cos 2(\omega_2 t + \phi) -$$
$$2V_{\omega 1}V_{\omega 2}\cos[(\omega_1 - \omega_2)t - \phi] +$$
$$2V_{\omega 1}V_{\omega 2}\cos[(\omega_1 + \omega_2)t + \phi]$$

To maintain the amplitude of the desired mode of oscillation, a voltage is applied between the ring forcer electrode 20 and the exterior metalized surface 32 of the resonator 14. If the radial displacement of the rim of the hemispherical resonator as a function of time is described by $\sin \omega t$, $\omega$ being the angular frequency of oscillation, then the voltage between the ring forcer electrode and the resonator electrode required to maintain oscillations should be proportional to $\sin 2\omega t$. To generate such a force, one could, for example, set $\omega_1 = \omega$, $\omega_2 = 3\omega$, and $\Phi = \pi/2$, in which case the only term of any importance in the above expression is the third:

$$F \propto V_{\omega 1} V_{\omega 2} \sin 2\omega t \quad (6)$$

It should be noted that the force F varies linearly with either $V_{\omega 1}$ or $V_{\omega 2}$.

To suppress quadrature oscillation, voltages are applied between four sets of four forcer electrodes 22 spaced 90 degrees apart and the exterior metalized surface 32 of the resonator 14, the sets being offset from one another by 22.5 degrees. If the radial displacement of the rim of the hemispherical resonator as a function of time is described by $\sin \omega t$, $\omega$ being the angular frequency of oscillation, then the voltage between the sets of forcer electrodes and the resonator electrode should be proportional to $\cos 2\omega t$. To generate such a force, one could, for example, set $\omega_1 = \omega$, $\omega_2 = 3\omega$, and $\Phi = 0$, in which case the only term of any significance in expression (5) is the third:

$$F \propto -V_{\omega 1} V_{\omega 2} \cos 2\omega t \quad (7)$$

Once again it should be noted that the force F varies linearly with either $V_{\omega 1}$ or $V_{\omega 2}$.

In the force-to-rebalance mode, a voltage is applied between nodal forcer electrodes 22 and the exterior metalized surface 32 of the resonator 14. If the radial displacement of the rim of the hemispherical resonator as a function of time is described by $\sin \omega t$, $\omega$ being the angular frequency of oscillation, then the voltage between the forcer electrodes and the resonator conducting region should be proportional to $\cos \omega t$. To generate such a force, one could, for example, set $\omega_1 = \omega$, $\omega_2 = 2\omega$, and $\Phi = 0$, in which case the only term of any significance in expression (5) is the third:

$$F \propto -V_{\omega 1} V_{\omega 2} \cos \omega t \quad (8)$$

Once again it should be noted that the force F varies linearly with either $V_{\omega 1}$ or $V_{\omega 2}$.

In order to minimize phasing errors, it may be desirable to choose $\omega_1$ and $\omega_2$ to be integral multiples or subintegral multiples (fractions) of $\omega$ obtained by counting down and/or multiplying from a common frequency.

The voltage $(V_1-V_2)$ between the resonator electrode and a forcer electrode can be realized by grounding either of the electrodes and placing the voltage $(V_1-V_2)$ on the other electrode. An alternative is to place the voltage $V_1$ on one of the electrodes and $V_2$ on the other.

The embodiment of the invention described above is described in terms of sinusoidal functions. A more general embodiment of the invention would be described in terms of periodic functions $F(\omega t + \Phi)$ in which case equations (3) become $$V_1 = V_{\omega 1} F(\omega_1 t)$$

$$V_2 = V_{\omega 2} F(\omega_2 t + \Phi) \quad (9)$$

The simplest example of such periodic functions is a square wave. The use of such periodic functions produce results equivalent to those obtained using sinusoidal functions.

Additional details concerning vibratory rotation sensors are contained in U.S. Pat. No. 4,951,508 by Loper, Jr. et al. dated Aug. 28, 1990 which is incorporated by reference.

What is claimed is:

1. A method for applying forces to the resonator of a vibratory rotation sensor (VRS), the surface of the resonator having one or more conducting regions, the VRS having a plurality of forcer electrodes opposing the conducting regions of the resonator's surface, the method comprising the steps:

generating a first ac voltage having a first frequency and a first phase, the first ac voltage being synchronized to the displacement of a point on the resonator when the resonator is vibrating;

generating a second ac voltage having a second frequency, the second ac voltage being synchronized to the displacement of a point on the resonator when the resonator is vibrating;

establishing a voltage difference between one or more forcer electrodes and one or more conducting regions of the resonator's surface, the voltage difference being equal to the difference of the first ac voltage and the second ac voltage.

2. The method of claim 1 wherein the ratio of the VRS vibrational frequency to the difference of the first and second frequencies is a ratio of integers.

3. The method of claim 1 wherein the ratio of the VRS vibrational frequency to the sum of the first and second frequencies is a ratio of integers.

* * * * *